Patented Sept. 3, 1946

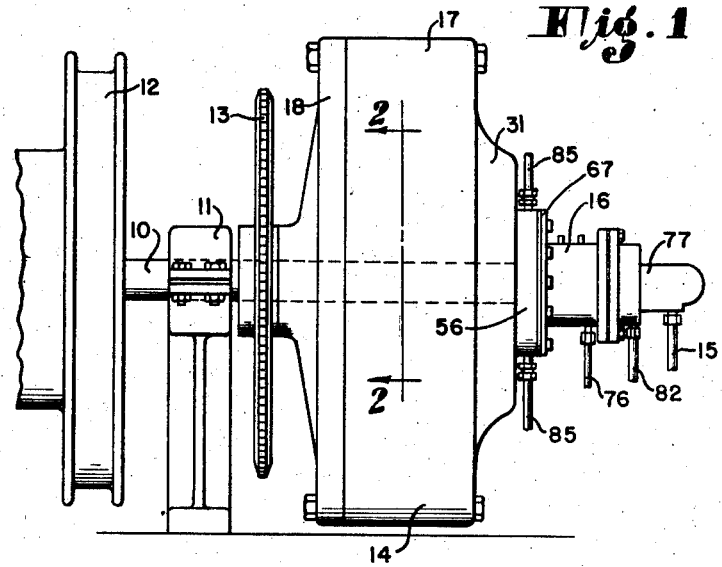
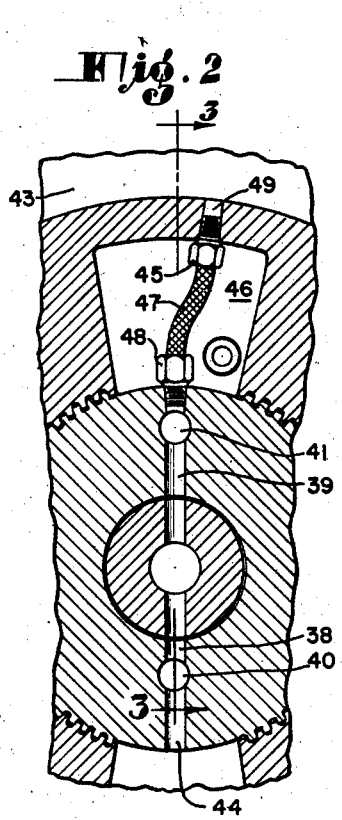
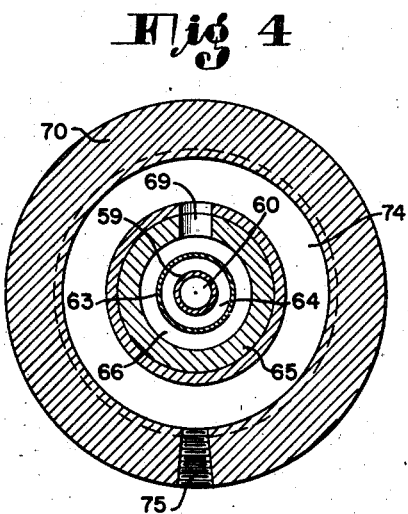

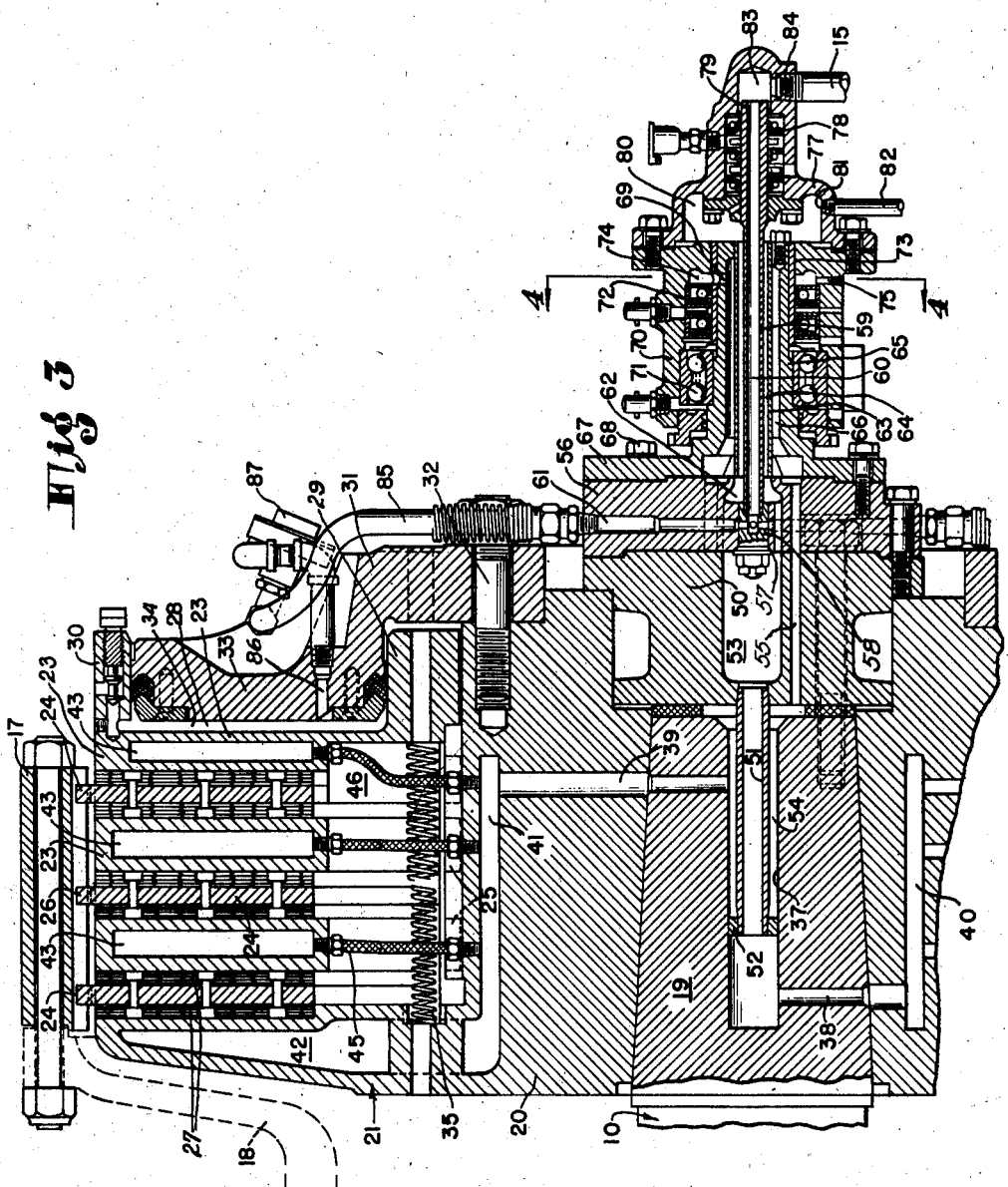

2,407,043

UNITED STATES PATENT OFFICE 2,407,043

AIR OPERATED CLUTCH

Guglielmo R. Tremolada, Los Angeles, Calif., assignor to Emsco Derrick & Equipment Company, Los Angeles, Calif., a corporation of California Application July 5, 1944, Serial No. 543,546

11 Claims. (Cl. 192—85)

This invention relates in general to drawworks such as employed in oil well derricks, and relates in particular to a friction clutch for connecting the cable spool of the drawworks to the drum shaft.

It is an object of the present invention to provide a durable multiple plate clutch which may be supported on the drawworks shaft and which may be operated by air pressure.

An object of the invention is to provide a friction clutch construction in association with the drum shaft and cable drum of a drawworks in which the parts are so related that they may be readily removed for purpose of inspection and renewal of wearing parts such as composition clutch facing and packing.

An object of the invention is to provide a shaft, a member rotatable on the shaft, such as the cable drum, having an outer cylindric wall projecting therefrom toward the end of the shaft, and a simple and rugged multiple plate friction clutch disposed within this outer cylindric wall, with means to form an annular piston connected to the end of the shaft which cooperates with an annular cylinder to form a pressure chamber to receive air for actuation of the clutch. In the preferred form of the invention, a quick relief valve is provided in the air duct adjacent the air cylinder.

A further object is to provide a multiple disc fluid operated clutch of this general character having means whereby it may be effectively water cooled, thereby, greatly increasing the life of the clutch by preventing an excessive temperature rise therein.

A further object of the invention is to provide a means whereby a fluid for operating the clutch may be delivered thereto, and also to provide means for conducting a cooling fluid, such as water, through the cooling chambers of the clutch.

A further object of the invention is to provide a swivel fluid connection whereby a cooling fluid may be circulated and a fluid for actuation of the pressure cylinder of the device may be delivered while relative rotation exists between cooperating parts of the device embodying my invention.

A further object of the invention is to provide a swivel connection of this character of novel form wherein different parts of the swivel may be selectively removed for the purpose of inspection or replacement of packing.

Further objects and advantages of the invention will be brought out in the following part of the specification.

Referring to the drawings which are for illustrative purposes only,

Fig. 1 is a fragmentary elevational view showing the invention in use with the cable drum of a drawworks.

Fig. 2 is an enlarged fragmentary cross section taken as indicated by the line 2—2 of Fig. 1.

Fig. 3 is a longitudinal sectional view through the upper portion of the clutch device, taken as indicated by the line 3—3 of Fig. 2.

Fig. 4 is a fragmentary cross section taken on a plane represented by the line 4—4 of Fig. 3.

In Fig. 1 I show a drum shaft 10 of a drawworks supported in bearing means 11 and having a cable drum 12. A sprocket 13 is turnable on the shaft 10 and has in association therewith a clutch 14 by which it may be connected to the shaft so as to drive the same. This clutch 14 is actuated by air which is delivered through a conduit 15 and a swivel connection 16.

As shown in Fig. 3, the clutch 14 includes an outer cylindric wall 17 which is connected to the sprocket by means of a wall 18 and surrounds the end portion 19 of the shaft 10. On the shaft 10 within the cylindric wall 17 there is an inner cylindric wall or hub 20 having an outwardly projecting flange 21 at its inner end. Surrounding the hub 20 within the outer cylindric wall 17 there is an assembly of annular friction plates 23 and 24, the first of these—namely, the plates 23—being chambered and having toothed connection 25 with the hub 20, and the second of these plates—namely, the friction plates 24—having toothed connection 26 with the outer cylindric wall 17, the plates 23 and 24 being therefore axially movable. The plates 24 have on the opposite faces thereof clutch plates 27 of a material having the desired frictional characteristics. Accordingly, when axial compression is applied to the assembly of friction plates, rotation of the sprocket 13 will be transmitted through the outer cylindric wall 17 and the plates 24 to the plates 23 and the flange 21, thereby driving the shaft 10.

The outer of the clutch plates 23 has therein an annular, outwardly faced, recess 28, defined by inner and outer side walls 29 and 30. A plate 31, secured to the end of the hub 20 by bolts 32, has thereon an annular piston 33 which enters the recess 28 so that a pressure chamber 34 is formed between the piston 33 and the end friction plate 23 of the assembly of friction plates. Fluid pressure applied to this chamber 34 will force the assembly of friction plates toward the flange 21 and thereby actuate the clutch 14. Spring members 35 act between the flange 21 and the outer friction plates 23 to force the outer friction plates 23 toward the piston 33 to accomplish separation of the friction plates when fluid pressure is released from the pressure chamber 34.

An opening or bore 37 extends inwardly from the end of the shaft 19 and from this bore 37 inlet and outlet passages 38 and 39 extend radially to meet inlet and outlet passages 40 and 41 formed axially within the hub 20. The ends of the passages 40 and 41 communicate with a cooling chamber 42 in the flange 21 and the passages 40 and 41 are connected to the chambers 43 of the first friction plates 23 by flexible connections 44 and 45 which are of like form.

As will be perceived from Figs. 2 and 3, the friction plates 23 have recesses or notches 46 in their inner edges. In each of these notches 46 one of the flexible connectors 44 or 45 is situated. Each connector 44 consists of a section of flexible conduits 47 having at its inner end a connector 48 whereby it is connected to the inlet passage 40 and having at its outer end a connector 49 whereby it may be connected to the associated chamber 43 through the inner wall of the friction plates 23 defining such chamber 43. In a like manner, each of the flexible connections 45 comprises a section of flexible conduits 47 and the inner and outer ends thereof are provided with connectors 48 and 49 whereby connections may be made with the passages 41 and the chambers 43. A body structure 50 is connected to the end of the drum shaft 10 and has thereon a tube 51 which projects into the bore 37 of the shaft and has thereon an enlargement or partition wall 52 which is disposed between the inner ends of the passages 38 and 39. The outer end of the tube 51 communicates with an opening or chamber 53 in the body structure 50, and the space 54 in the bore 37 surrounding the tube 51 communicates with an opening 55 which extends through the body structure 50.

The body structure 50 includes an outer plate 56 having an axial tapered bore 57 to receive a tapered plug 58 disposed on the inner end of a projecting tube 59. The lumen 60 of the tube 59 communicates with a radial passage 61 in the plate 56 of the body structure 50, and surrounding the inner end of the tube 59 the plate 56 has an annular opening 62 which communicates with the opening 53. A second or middle projecting tube 63 projects from the body structure in a position surrounding a portion of the inner tube 59, forming therearound a second projecting passage 64. Around this middle tube 63 there is an outer projecting tube 65 defining around the tube 63 a third projecting passage 66. The second projecting passage 64 communicates at its inner end through the openings 62 and 53 with the interior of the tube 51, and the outer projecting passage 66 communicates through the opening 55 with the space 54 in the bore 37 surrounding the tube 51. The outer tube 65 has on its inner end a flange 67 whereby it may be removably secured to the face of the plate 56 by screws 68. The middle tube 63 is supported within the outer tube 65 and the passage 66 between these tubes communicates with the exterior of the outer tube 65 through an opening 69. A cylindric shell 70 is turnably mounted on the outer tube 65 by means of a roller bearing 71, and between the bearing 71 and the opening 69 there is packing means 72. The outer end of the shell 70 comprises an inwardly directed flange 73 which engages the end of the tube 65 and defines a chamber 74 which communicates with the passage 66 through the opening 69 and which has an external port 75 to which a cooling fluid conduit 76 may be connected. A cap 77, bolted on the end of the shell 70, contains packing means 78 in turning engagement with the projecting end 79 of the inner tube 59. This cap 77 defines a chamber 80 which communicates with the passage 64 and has a port 81 to which a cooling fluid conduit 82 may be connected. At the outer end of the cap 77 there is a chamber 83 communicating with the passage 60 through the tube 59 and having a port 84 to which the air conduit 15 is connected.

The radial passage 61 of the plate 56 is connected by a conduit 85 with a port 86 in the piston 33 communicating with the pressure chamber 34. A quick relief valve 87 is interposed in or connected to the conduit 85 so as to provide a quick connection with the atmosphere when pressure is released in the conduit 85, such quick relief valve being old in the art pertaining to air operated devices.

In the operation of the equipment, water, as a cooling fluid, is fed in through the conduit 82 to the chamber 80 of the swivel connection 16. This water flows through the projecting passage 64, the opening 53, the tube 51, and inlet passages 38 and 40 to the chambers 42 and 43. From these chambers 42 and 43, the cooling fluid passes to the chamber 74 of the swivel connection and is carried away by the conduit 76. Actuation of the clutch results from the application of air pressure through the conduit 15. This air pressure passes through the projecting tube 59 to the radial passage 61 and is carried by the conduit 85 to the pressure chamber 34.

I claim as my invention:

1. In a power device of the character described, the combination of: a shaft member; an outer member in turning relation to said shaft member and having an outer cylindric wall projecting therefrom toward the end of said shaft member; an inner cylindric wall member fixed on said shaft member within said outer wall member; an inner flange extending from the inner end of said inner wall member toward said outer wall member; an assembly of first and second annular friction plates disposed around said inner wall member in alternate order, said first plates being connected to said inner wall member and said second plates being connected to said outer wall member but having axial movement relatively thereto, the outer of said plates having an inner cylindric wall with an outwardly presented cylindric surface and an outer cylindric wall with an inwardly presented cylindric surface so as to form an annular recess in its outer face; an outer flange fixed on said shaft member and having an annular piston in said annular recess, said piston having an outer cylindric wall with an inwardly presented cylindric surface confronting said outwardly presented surface of said outer plate and an outwardly presented cylindric surface confronting said inwardly presented cylindric surface of said plate, to form in said recess an annular pressure chamber; and means to apply fluid pressure to said chamber to force said assembly of friction plates toward said inner flange.

2. In a power device of the character described, the combination of: a shaft member having an axial bore leading in from the end thereof; an outer member in turning relation to said shaft member and having an outer cylindric wall projecting therefrom toward the end of said shaft member; an inner cylindric wall member fixed on said shaft member within said outer wall member, there being inlet and outlet passages in said inner wall member and said shaft member communicating with said bore of said shaft member; an inner flange extending from the inner end of said inner wall member toward said outer wall member; an assembly of first and second annular friction plates disposed around said inner wall member in alternate order, said first plates being chambered and being connected to said inner wall member and said second plates being connected to said outer wall member but having axial movement relatively thereto, the outer of said plates having an annular recess in its outer face; an outer flange fixed on said shaft member and having an annular piston in said annular recess to form in said recess an annular pressure chamber; means forming ducts connecting said inlet and outlet passages with the chambers of said first plates; and means to apply fluid pressure to said pressure chamber to force said assembly of friction plates toward said inner flange, and passing a cooling fluid through said axial bore of said shaft member to and from said inlet and outlet passages so that it will circulate through the chambers of said first plates.

3. In a power device of the character described, the combination of: a shaft member; an outer member in turning relation to said shaft member and having an outer cylindric wall projecting therefrom toward the end of said shaft member; an inner cylindric wall member fixed on said shaft member within said outer wall member, there being inlet and outlet passages in said inner wall member; an inner flange extending from the inner end of said inner wall member toward said outer wall member; an assembly of first and second annular friction plates disposed around said inner wall member in alternate order, said first plates being chambered and being connected to said inner wall member and said second plates being connected to said outer wall member but having axial movement relatively thereto, the outer of said plates having an annular recess in its outer face; an outer flange fixed on said shaft member and having an annular piston in said annular recess to form in said recess an annular pressure chamber; means forming ducts connecting said inlet and outlet passages with the chambers of said first plates; an inner tube extending from the end of said shaft member on its axis of rotation, forming a projecting fluid passage; a middle tube projecting from the end of said shaft member and forming around said inner tube a second projecting passage; an outer tube projecting from the end of said shaft member and forming around said middle tube a third projecting passage, the inner ends of said projecting passages being connected to said inlet and outlet passages, and to said pressure chamber; and a shell on said assembly of tubes in turning relation thereto, said shell having ports communicating respectively with said projecting passages defined by said tubes, whereby fluid under pressure may be directed into said annular chamber and a cooling fluid may be passed through said chambers of said first plates.

4. In a power device of the character described, the combination of: a shaft member; an outer member in turning relation to said shaft member and having an outer cylindric wall projecting therefrom toward the end of said shaft member; an inner cylindric wall member fixed on said shaft member within said outer wall member, there being inlet and outlet passages in said inner wall member; an inner flange extending from the inner end of said inner wall member toward said outer wall member; an assembly of first and second annular friction plates disposed around said inner wall member in alternate order, said first plates being chambered and being connected to said inner wall member and said second plates being connected to said outer wall member but having axial movement relatively thereto, the outer of said plates having an annular recess in its outer face; an outer flange fixed on said shaft member and having an annular piston in said annular recess to form in said recess an annular pressure chamber; means forming ducts connecting said inlet and outlet passages with the chambers of said first plates; an inner tube extending from the end of said shaft member on its axis of rotation, forming a projecting fluid passage; a middle tube projecting from the end of said shaft member and forming around said inner tube a second projecting passage; an outer tube projecting from the end of said shaft member and forming around said middle tube a third projecting passage, said middle and outer tubes being shorter than said inner tube so that said inner tube will have a projecting end, and the inner ends of said projecting passages being connected to said inlet and outlet passages and to said pressure chamber; a sleeve member supported on said outer tube by means of a bearing, said sleeve having a port communicating with said third projecting passage; and a cap mounted on the end of said sleeve having seal forming means therein to engage the projecting end of said inner tube, said cap member defining against the outer end of said sleeve a ported chamber communicating with the end of said second passage and defining a ported chamber communicating with the outer end of said passage through said inner tube, whereby from relatively stationary conduits fluid under pressure may be directed into said annular chamber and a cooling fluid may be passed through said chambers of said first plates.

5. In a power device of the character described, the combination of: a shaft member having thereon means operated by fluid under pressure and means to be cooled by a flow of cooling fluid, said first named means having an expansible chamber to receive fluid under pressure and said shaft member having an inlet passage and an outlet passage communicating with the means to be cooled; an inner tube extending from the end of said shaft member on its axis of rotation, forming a projecting fluid passage, the inner end of said projecting passage communicating with said expansible chamber; a middle tube projecting from the end of said shaft member and forming around said inner tube a second projecting passage, the inner end of said second projecting passage communicating with one of said passages of said shaft member; an outer tube projecting from the end of said shaft member and forming around said middle tube a third projecting passage, the inner end of said third projecting passage communicating with the other of said passages of said shaft member; and a shell on said assembly of tubes in turning relation thereto, said shell having ports communicating respectively with said projecting passages defined by said tubes, whereby fluid under pressure may be directed into said expansible chamber and a cooling fluid may be passed through said means to be cooled.

6. In a power device of the character described, the combination of: a shaft member having thereon means operated by fluid under pressure and means to be cooled by a flow of cooling fluid, said first named means having an expansible chamber to receive fluid under pressure and said shaft member having an inlet passage and an outlet passage communicating with the means to be cooled; an inner tube extending from the end of said shaft member on its axis of rotation, forming a projecting fluid passage; a middle tube projecting from the end of said shaft member and forming around said inner tube a second projecting passage; an outer tube projecting from the end of said shaft member and forming around said middle tube a third projecting passage, said middle and outer tubes being shorter than said inner tube so that said inner tube will have a projecting end, and the inner ends of said projecting passages being connected to said inlet and outlet passages, and to said chamber; a sleeve member supported on said outer tube by means of a bearing, said sleeve having a port communicating with said third projecting passage; and a cap mounted on the end of said sleeve having seal forming means therein to engage the projecting end of said inner tube, said cap member defining against the outer end of said sleeve a ported chamber communicating with the outer end of said passage through said inner tube, whereby from relatively stationary conduits fluid under pressure may be directed into said expansible chamber and a cooling fluid may be passed through said chambers of said means to be cooled.

7. In a power device of the character described, the combination of: a shaft member having thereon means operated by fluid under pressure and means to be cooled by a flow of cooling fluid, said first named means having an expansible chamber to receive fluid under pressure and said shaft member having an inlet passage and an outlet passage communicating with the means to be cooled; an inner tube extending from the end of said shaft member on its axis of rotation, forming a projecting fluid passage; a middle tube projecting from the end of said shaft member and forming around said inner tube a second projecting passage; an outer tube projecting from the end of said shaft member and forming around said middle tube a third projecting passage, the inner ends of said projecting passages being connected to said inlet and outlet passages and to said chamber; and a shell on said assembly of tubes in turning relation thereto, said shell having ports communicating respectively with said projecting passages defined by said tubes, whereby fluid under pressure may be directed into said expansible chamber and a cooling fluid may be passed through said means to be cooled.

8. In a power device of the character described, the combination of: a shaft member having thereon means operated by fluid under pressure and means to be cooled by a flow of cooling fluid, said first named means having an expansible chamber to receive fluid under pressure and said shaft member having an axial bore from which lead an inlet passage and an outlet passage communicating with the means to be cooled; a body structure connected to the end of said shaft member, said body structure having first, second, and third openings therein, said third opening connecting at its inner end to said bore of said shaft member, and a tube connected to said second opening and extending from said body structure into said bore and having thereon between the inner ends of said inlet and outlet passages an annular partition member; means connecting said first opening with said expansible chamber; an inner tube projecting axially from said body structure to form a first projecting passage, the inner end of which communicates with said first opening; a middle tube projecting from said body structure and defining a second projecting passage around said inner tube, the inner end of said second projecting passage communicating with said second opening; an outer tube projecting from said body structure around said middle tube and forming therearound a third projecting passage, the inner end of which communicates with said third opening; and a shell structure surrounding said projecting tubes in turning relation thereto, said shell structure having three ports communicating respectively with said three projecting passages defined by said projecting tubes.

9. In a power device of the character described, the combination of: a shaft member; an outer cylindric member surrounding said shaft member in turning relation thereto; first and second flanges connected to said shaft member and extending radially therefrom in axially spaced relation; an assembly of first and second friction plates disposed around said shaft between said first and second flanges and within said outer member, said first plates being connected to said shaft member and said second plates being connected to said outer member; walls cooperating with said second flange and the outer of said first friction plates to form an expansible chamber in which fluid may act to force said friction plates into operative engagement, there being an opening through said outer flange communicating with said chamber; wall means connected to said shaft having a fluid delivery passage; and fluid conveying means connecting said fluid delivery passage with said opening through said outer flange, said fluid conveying means comprising a duct connecting said passage with said opening, and a quick relief valve connected to said duct.

10. In a power device of the character described, comprising a shaft member having thereon means operated by fluid under pressure and means to be cooled by a flow of cooling fluid, said first named means having an expansible chamber to receive fluid under pressure and said shaft member having an axial bore from which lead an inlet passage and an outlet passage communicating with the means to be cooled and walls forming a pressure passage communicating with said chamber, the combination of: a body structure for connection to the end of said shaft member, said body structure having first, second, and third openings therein, said first opening communicating with said pressure passage, said third opening connecting at its inner end to said bore of said shaft member, and a tube connected to said second opening and extending from said body structure into said bore, and having thereon between the inner ends of said inlet and outlet passages an annular partition member; an inner tube projecting axially from said body structure to form a first projecting passage, the inner end of which communicates with said first opening; a middle tube projecting from said body structure and defining a second projecting passage around said inner tube, the inner end of said second projecting passage communicating with said second opening; an outer tube projecting from said body structure around said middle tube and forming there around a third projecting passage, the inner end of which communicates with said third opening; and a shell structure surrounding said projecting tubes in turning relation thereto, said shell structure having three ports communicating respectively with said three projecting passages defined by said projecting tubes.

11. In a power device of the character described, comprising a shaft member having thereon means operated by fluid under pressure and means to be cooled by a flow of cooling fluid, said first named means having an expansible chamber to receive fluid under pressure, an inlet passage and an outlet passage communicating with the means to be cooled, and walls forming a pressure passage communicating with said chamber, the combination of: a body structure for connection to the end of said shaft member, said body structure having first, second, and third openings therein for communicating individually with said passages; an inner tube projecting axially from said body structure to form a first projecting passage, the inner end of which communicates with said first opening; a middle tube projecting from said body structure and defining a second projecting passage around said inner tube, the inner end of said second projecting passage communicating with said second opening; an outer tube projecting from said body structure around said middle tube and forming there around a third projecting passage, the inner end of which communicates with said third opening; and a shell structure surrounding said projecting tubes in turning relation thereto, said shell structure having three ports communicating respectively with said three projecting passages defined by said projecting tubes.

GUGLIELMO R. TREMOLADA.